United States Patent
Beitz et al.

(10) Patent No.: US 10,969,509 B2
(45) Date of Patent: Apr. 6, 2021

(54) SPATIAL DISTRIBUTION OF MARINE VIBRATORY SOURCES

(71) Applicant: PGS Geophysical AS, Oslo (NO)

(72) Inventors: Manuel Beitz, Houston, TX (US); Christian Strand, Houston, TX (US)

(73) Assignee: PGS Geophysical AS, Oslo (NO)

( * ) Notice: Subject to any disclaimer, the term of this patent is extended or adjusted under 35 U.S.C. 154(b) by 357 days.

(21) Appl. No.: 16/000,542

(22) Filed: Jun. 5, 2018

(65) Prior Publication Data

US 2018/0364384 A1 Dec. 20, 2018

Related U.S. Application Data

(60) Provisional application No. 62/520,892, filed on Jun. 16, 2017.

(51) Int. Cl.
*G01V 1/38* (2006.01)
*G01V 1/00* (2006.01)

(52) U.S. Cl.
CPC ............ *G01V 1/3808* (2013.01); *G01V 1/006* (2013.01); *G01V 1/3817* (2013.01); *G01V 1/3861* (2013.01); *G01V 1/3843* (2013.01); *G01V 2210/127* (2013.01)

(58) Field of Classification Search
CPC .... G01V 1/3808; G01V 1/006; G01V 1/3817; G01V 1/3861; G01V 1/3843; G01V 2210/127
See application file for complete search history.

(56) References Cited

U.S. PATENT DOCUMENTS

| | | | |
|---|---|---|---|
| 3,351,899 A * | 11/1967 | Luehrmann | G01V 1/3808 367/23 |
| 4,914,636 A | 4/1990 | Garrotta | |
| 5,717,655 A * | 2/1998 | Beasley | G01V 1/006 367/53 |

(Continued)

FOREIGN PATENT DOCUMENTS

| | | |
|---|---|---|
| WO | 2014195503 A2 | 12/2014 |
| WO | 2015195939 A1 | 12/2015 |
| WO | 2017153845 | 9/2017 |

OTHER PUBLICATIONS

International Search Report & Written Opinion in Appl. No. PCT/EP2018/065964 dated Oct. 10, 2018, 11 pages.

(Continued)

*Primary Examiner* — Ian J Lobo

(57) ABSTRACT

Techniques are disclosed relating to geophysical surveying. In some embodiments, a marine survey vessel tows multiple sensor streamers in addition to vibratory sources deployed relative to the sensor streamers. In some embodiments, the vessel tows vibratory sources emitting energy within different frequency bands in different deployment zones. In some embodiments, one or more sources are driven with different sweep functions, different activation patterns, and/or different sweep lengths. Various disclosed techniques for manufacturing a geophysical data product may potentially simplify equipment used for towing sources, reduce survey complexity without reducing resolution, increase resolution without increasing survey complexity, improve energy content recovered from deep reflections, and/or reduce the environmental impact of emitting seismic energy.

20 Claims, 12 Drawing Sheets

(56) References Cited

U.S. PATENT DOCUMENTS

| | | | |
|---|---|---|---|
| 5,761,152 A * | 6/1998 | Jacobsen | G01V 1/3808 |
| | | | 367/15 |
| 9,158,019 B2 * | 10/2015 | Bagaini | G01V 1/3808 |
| 2014/0169132 A1 * | 6/2014 | Sallas | G01V 1/005 |
| | | | 367/37 |
| 2014/0241117 A1 * | 8/2014 | Dellinger | G01V 1/005 |
| | | | 367/15 |
| 2014/0269173 A1 | 9/2014 | Coste et al. | |
| 2017/0199292 A1 | 7/2017 | Tonnessen et al. | |
| 2017/0235003 A1 | 8/2017 | Elboth et al. | |

OTHER PUBLICATIONS

OGP, International Association of Geophysical Contractors, An overview of marine seismic operations, Report No. 448, Apr. 2011, 50 pages.

* cited by examiner

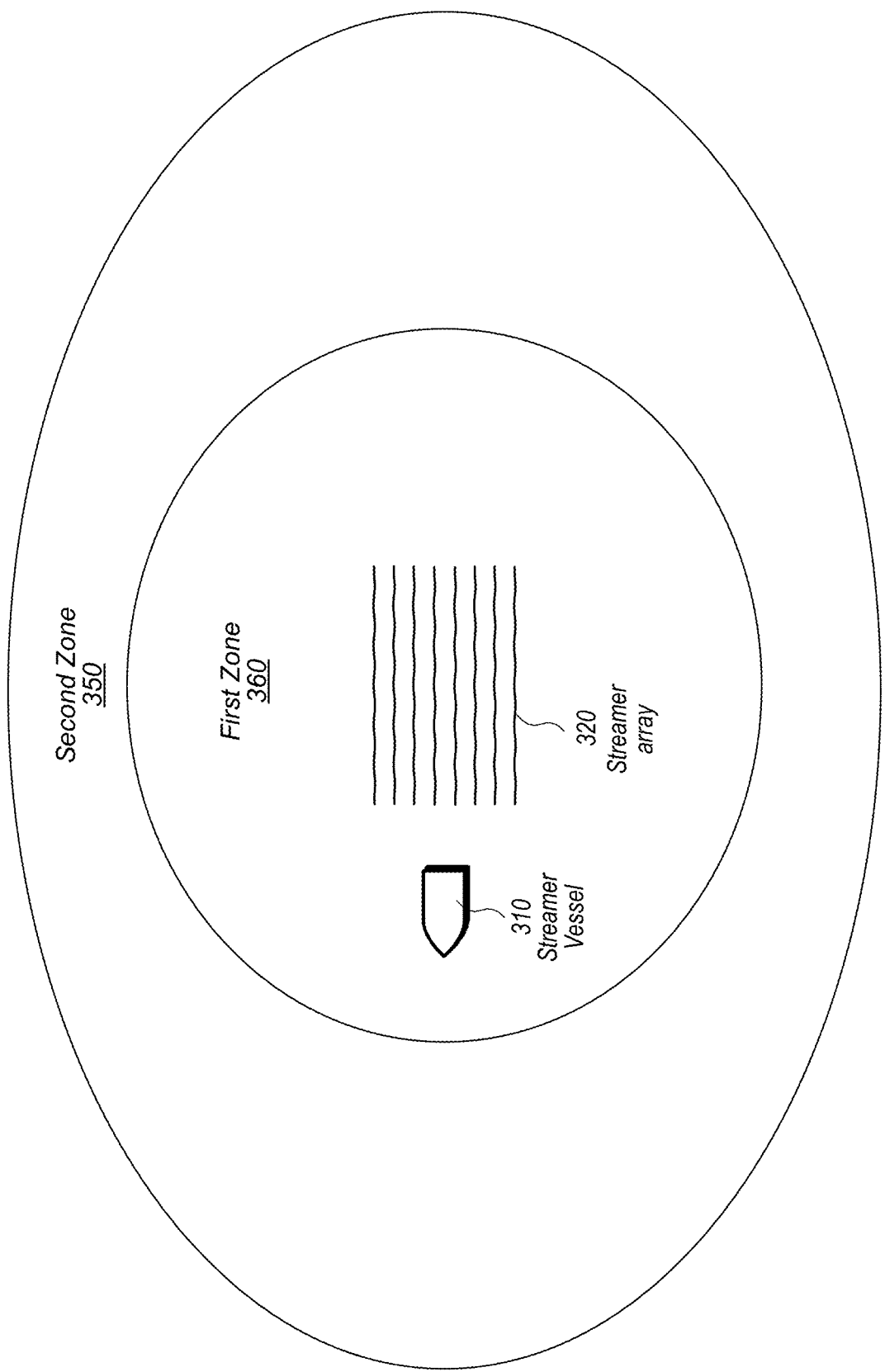

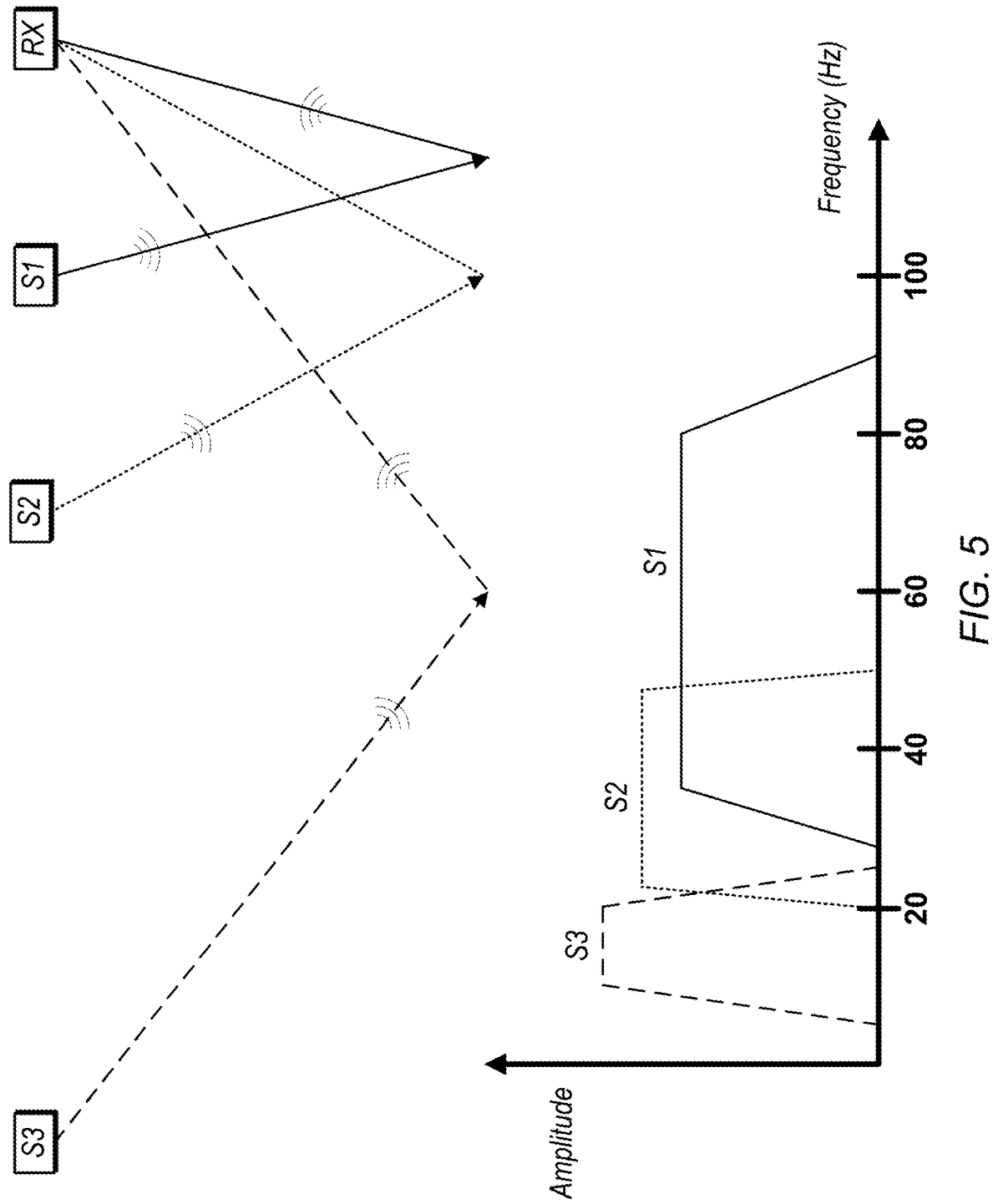

SPATIAL DISTRIBUTION OF MARINE VIBRATORY SOURCES

This application claims the benefit of U.S. Provisional Application No. 62/520,892, filed on Jun. 16, 2017, which is hereby incorporated by reference as if fully set forth herein.

BACKGROUND

Geophysical surveys are often used for oil and gas exploration in geophysical formations, which may be located below marine environments. Seismic geophysical surveys, for example, are based on the use of acoustic waves. In marine seismic surveys, a survey vessel may tow an acoustic source (e.g., an air gun or a marine vibrator) and a plurality of streamers along which a number of acoustic sensors (e.g., hydrophones and/or geophones) are located. Acoustic waves generated by the source may then be transmitted into the earth's crust and then reflected back and captured at the geophysical sensors. Data collected during a marine geophysical survey may be analyzed to locate hydrocarbon-bearing geological structures, and thus determine where deposits of oil and natural gas may be located.

BRIEF DESCRIPTION OF THE DRAWINGS

FIG. 3A is a diagram illustrating exemplary zones for deployment of first and second sets of vibratory sources, according to some embodiments.

FIG. 5 is a diagram illustrating three different exemplary frequency bands of signals emitted by a source at three different offsets from a receiver, according to some embodiments.

Figure 1:
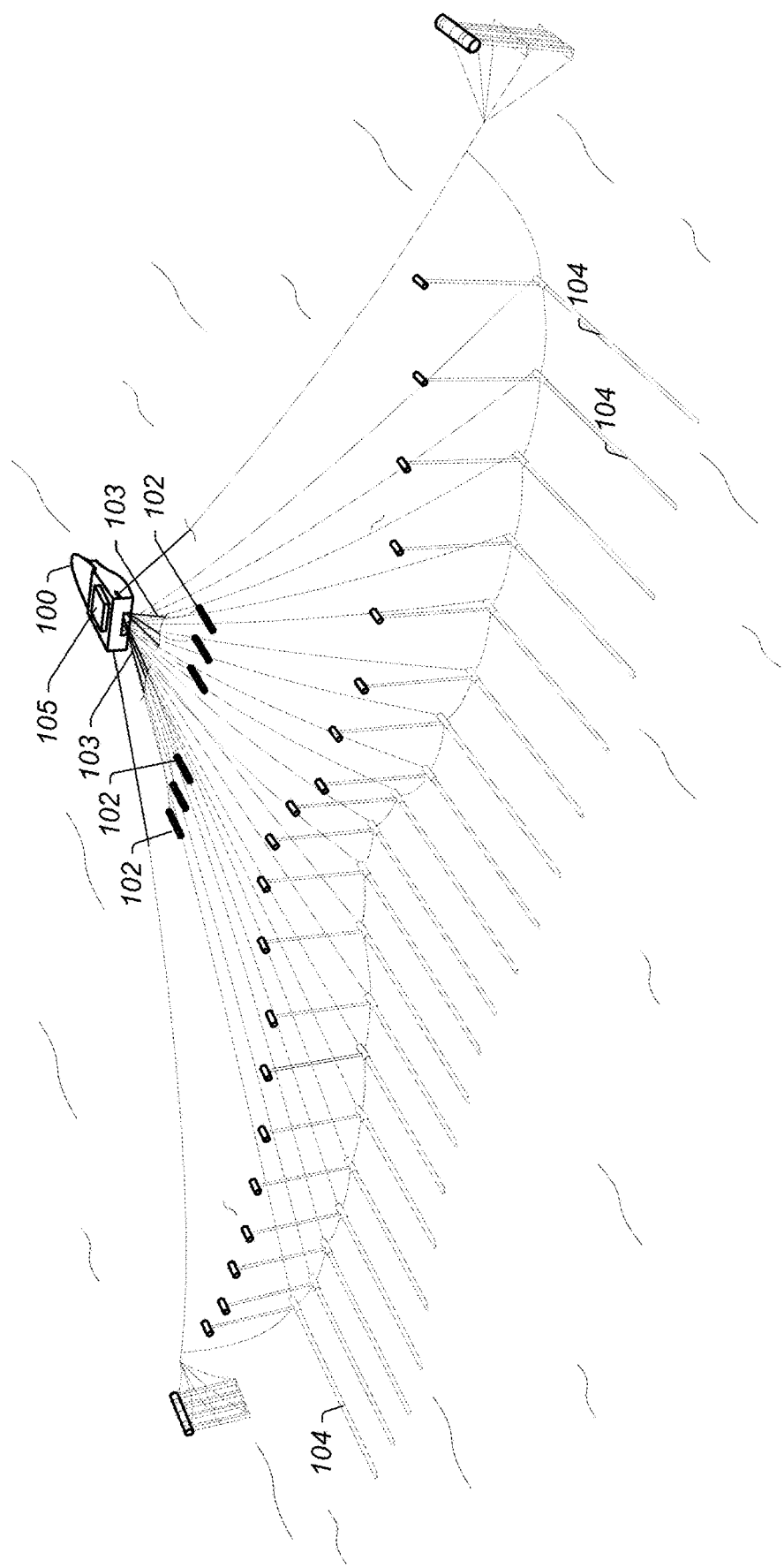
FIG. 1 is a diagram illustrating an exemplary geophysical survey system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc.

Reciting that a unit/circuit/component is "configured to" perform one or more tasks is expressly intended not to invoke 35 U.S.C. § 112(f) for that unit/circuit/component. Accordingly, none of the claims in this application as filed are intended to be interpreted as having means-plus-function elements. Should Applicant wish to invoke Section 112(f) during prosecution, it will recite claim elements using the "means for" [performing a function] construct.

It is to be understood the present disclosure is not limited to the exemplary devices or methods described, which may, of course, vary. It is also to be understood that the terminology used herein is for the purpose of describing exemplary embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," "comprising," and derivations thereof, mean "including, but not limited to." The term "coupled" means directly or indirectly connected.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

A goal in geophysical marine surveys should be to balance adequate regularity in spacing and use of signal sources and geophysical sensors with reasonable acquisition cost. Achieving desired coverage with less equipment (e.g., streamers with wider spacing) may reduce system complexity and cost and may help avoid physical entanglement of streamers. Similarly, achieving desired coverage with a different arrangement of equipment (e.g. the acquisition geometry of acoustic sources or streamers) may reduce system complexity and cost, improve data quality, or reduce environmental impact.

Exemplary Survey System

Referring to FIG. 1, a diagram illustrating an exemplary embodiment of a geophysical survey system is shown. In the embodiment shown, tow vessel 100 is towing an array of submerged streamers 104. Each of the submerged streamers may include a number of seismic sensors. The types of sensors that may be implemented in a given streamer include (but are not limited to) hydrophones and geophones. Moreover, a given streamer may include more than one type of sensor (e.g., a combination of hydrophones and geophones). In some embodiments, streamers 104, including a number of seismic sensors, may be towed by another vessel or vessels (not shown).

Tow vessel 100 may also tow a number of sources 102 via tow cables 103. Sources 102 may be towed by another vessel or vessels (not shown). Sources 102 may include a variety of seismic sources, such as marine vibrators, air guns, etc. Sources 102 may transmit sound waves into the water, the reflections of which may be detected by the seismic sensors of the streamers 104. The sensors and receivers of streamers 104 may be coupled (e.g. electrically, optically, wirelessly, etc.) to electronic equipment 105 aboard tow vessel 100 that may be used to record or analyze geophysical data, such as received reflections or detected signals, or transmit geophysical data for analysis onshore. In some embodiments, electronic equipment 105 includes at least one computing system (an exemplary embodiment of which is discussed below with reference to FIG. 10) configured to control actuation of sources 102, record data from sensors, steer survey elements, and/or process sensor data. In some embodiments, electronic equipment 105 is configured to control sources 102 (e.g., to generate vibrations based on various sweep functions, indicate when they should activate, where they should be positioned, what codes they should use, etc.). Electronic equipment 105 may also include navigation equipment (not shown separately), which may be configured to control, determine, and record, at selected times, the geodetic positions of: tow vessel 100, sources 102, and/or sensors located on streamers 104. Geodetic position may be determined using various devices, including global navigation satellite systems such as the global positioning system (GPS), for example. Using the arrangement shown in FIG. 1, marine geophysical surveys may be conducted. Among the uses of information obtained from such surveys may be the identification of geological formations indicative of oil and/or natural gas deposits. Parameters to be considered in the design of a geological survey may include the depth of subsea formations surveyed, the offset between sources and sensors, and the operating frequency bands for various sources.

Exemplary Offsets Between Sources and Sensors

Figure 2:
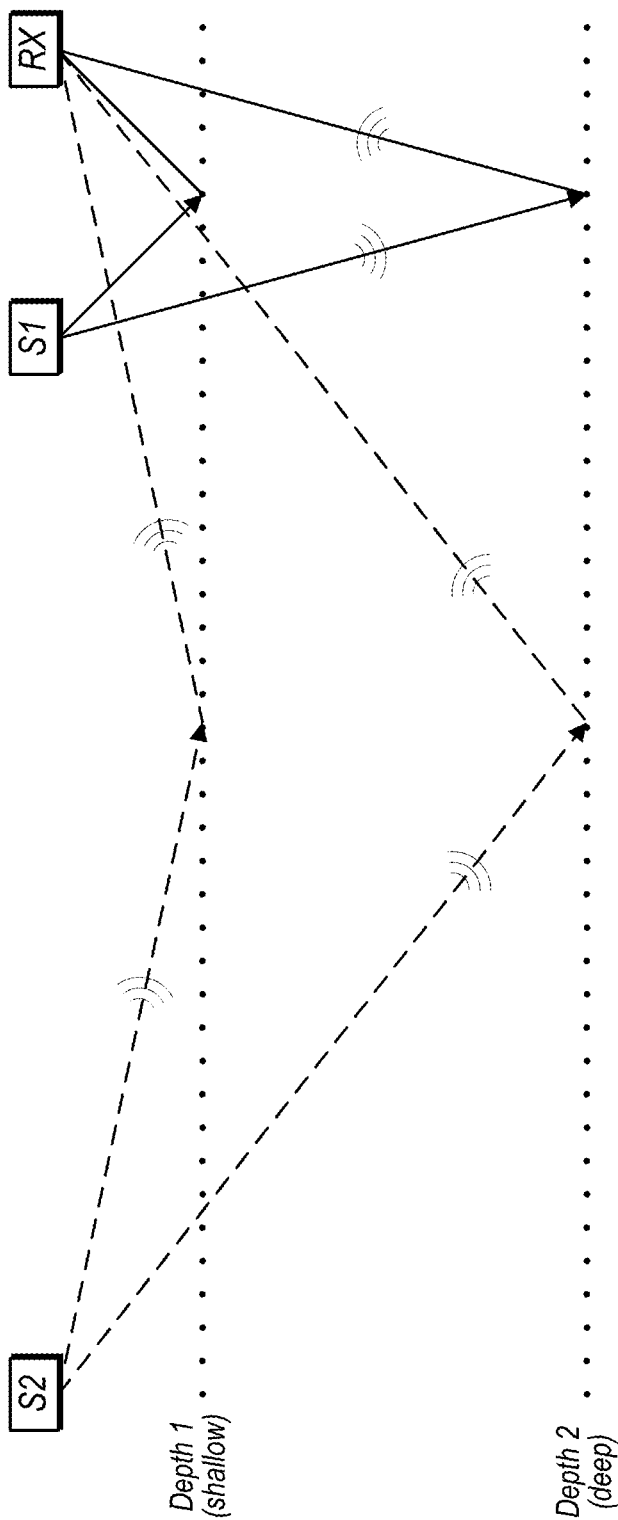
FIG. 2 is a diagram illustrating different offset distances between seismic sensors and vibratory sources, according to some embodiments.

FIG. 2 is a diagram illustrating different exemplary offset distances between seismic sensors and vibratory sources. As used herein, the term "offset" is to be interpreted according to its well-understood meaning in the art, which includes a distance between a source and a point on a streamer array (e.g., a location of a sensor). If the source and point are at the same depth, then the offset distance is in a direction parallel to the surface of the water. If the source and point are at different depths, the offset distance may or may not be measured parallel to the surface of the water, e.g., depending on processing techniques.

With reference to FIG. 2, source S2 has a large offset from sensor RX, and source S1 has a smaller offset from sensor RX. In some embodiments, the system may record and/or analyze reflections from one or both of sources S1 and S2 and at one or both of depth 1 and depth 2. Depending on the depth of a survey objective, different frequency emissions and different offsets may or may not be useful in providing useful reflection data. Typically, energy reflected from deeper survey objectives can be recorded and used effectively at higher offsets than energy reflected from shallower objectives. Notice, for example, as shown in FIG. 2, that the angle of incidence of the reflection events is greater at depth 1 than at depth 2 for both of the offsets depicted. In some embodiments, there is a maximum limit for reflection incidence angles that are useful in imaging. As can be seen from FIG. 2, the deeper events will reach this maximum incidence angle at a higher offset than will the shallow reflection events. It is also the case that the earth may filter seismic signals, which can cause reflections from deeper objectives to be particularly attenuated for higher frequencies. Therefore, emitting higher frequency signals from sources at greater offsets may not contribute useful survey data, e.g., because these signals may have unacceptably large incidence angles at shallow reflections and too much filtering from the earth for deeper reflections. For example, in conventional techniques, data corresponding to reflections from overcritical incidence angles may be ignored, e.g., by stretch-muting, which may involve zeroing data that requires a large amount of normal moveout correction (which causes stretching of the waveform at longer offsets).

Vibratory sources employed in the geophysical surveying industry typically have a band-limited frequency output. Types of sources may be discussed herein according to the frequency content they are configured to emit (e.g. a lower frequency or higher frequency source). For example, a lower frequency source may be configured to emit frequencies between 5 and 25 Hz, and a higher frequency source may be configured to emit frequencies between 20 and 100 Hz.

In some embodiments, survey modeling techniques are used to determine the threshold offset distance beyond which reflected energy from a higher frequency source is unlikely to contribute to geophysical data gathering. For example, higher frequencies from sources located beyond a threshold offset distance could be substantially prevented from reaching sensors because of filtering by the earth. In some embodiments, this threshold offset distance delimits the area, relative to a streamer array of seismic sensors, in which deployment of higher frequency sources will contribute significantly to the geophysical data product. In some embodiments, only lower frequency sources are deployed at offsets outside of this area while both lower frequency and higher frequency sources are deployed within this area. In other embodiments, rather than limit the offset or deployment zones for a particular type of source, sources may be deployed at various offsets but may be controlled to emit only a portion of their respective frequency bandwidths based on their offset from the streamer array (e.g. a source configured to emit both lower and higher frequencies may be controlled to emit only lower frequency content when placed at a larger offset). Geophysical surveys may be designed and conducted such that sources are towed in different zones based on their frequency bands and/or controlled to emit in different frequency bands based on their offset distances. The disclosed techniques may conserve energy, reduce environmental impact, and/or simplify survey arrays.

Exemplary Deployment Zones for Different Source Types

FIG. 3A is a diagram illustrating exemplary zones in which different source types are deployed, according to some embodiments.

In the embodiment illustrated in FIG. 3A, streamer vessel 310 tows streamer array 320, which contains one or more streamers that each include one or more seismic sensors.

Although FIG. 3A illustrates a single streamer vessel 310, some embodiments may employ multiple vessels towing a separate portion of one or more sources, one or more sensors, or any combination of sources and sensors.

Zones for deployment of different types of sources may be determined based on a threshold offset distance for a particular source or type of source. For example, deployment of one or more higher frequency sources may be limited to a circular region, with the radius of the circle being the threshold offset distance, referenced to the center of the streamer array (a single point), which coincides with the center of the circle. In another example, deployment of one or more higher frequency sources may be limited in a cross-line dimension, with the threshold offset distance referenced to a centerline of the streamer array. In this example, the zone may be oblong-shaped with half-circles corresponding to each end of the centerline. Some embodiments may employ other reference locations within or outside of the streamer array, such as the four corners of a rectangular streamer array, multiple points along a centerline of travel of the array, an off-center point or line within the streamer array, the entire perimeter of the streamer array, or a location between ones of multiple towed arrays, among others.

In some embodiments, only one type of source may be deployed in a zone. For example, first zone 360 may contain only higher frequency sources. In other embodiments, more than one type of source may be deployed in a zone. For example, first zone 360 may contain both lower and higher frequency sources. In some embodiments, second zone 350 contains only lower frequency sources, e.g., to avoid emitting higher frequencies in this zone that would be substantially prevented from reaching sensors because of filtering by the earth.

In some embodiments, different zones specify areas in which a particular mode of operation occurs, in addition to or in place of specifying the type of source deployed. For example, a source deployed in second zone 350 may emit a lower-frequency portion of the frequency spectrum that it is capable of emitting or may be a type of source that can only emit within a particular lower-frequency band. Thus, in some embodiments, first zone 360 and/or second zone 350 may contain a single type of wideband source configured to emit both low and high frequencies. In these embodiments, a wideband type source configured to emit both low and high frequencies may be controlled to emit only a sub-band of the frequencies it is capable of emitting when it is towed in the second zone. For example, a wideband source deployed at a high offset in second zone 350 may emit only lower frequencies because high frequency reflections may be determined not to significantly contribute to signals received by streamer array 320. In some embodiments, rather than delimiting specific zones, surveys may be designed and conducted such that sources are controlled to emit different portions of the frequency band in which they are capable of emitting, using a function of their nominal or measured offset from one or more points in the streamer array. For example, N sources at N different offsets, in these embodiments, may all emit within different frequency bands. Speaking generally, each "set" of sources discusses herein may include one or more of a corresponding type of source.

Note that types of sources may be differentiated according to the frequency content they are configured to emit (e.g. a lower frequency or higher frequency source), but types of sources may be differentiated according to other operating characteristics as well. For example, a first type of source may be configured to emit high amplitude seismic energy over a long sweep duration, and a second type of source may be configured to emit less seismic energy for a shorter sweep length. As yet another example, a first type of source may be configured to emit seismic energy in a rapid activation pattern, with short intervals between consecutive sweeps, and a second type of source may be configured to emit seismic energy in a slower activation pattern, with greater time or distance between consecutive sweeps. As another example, a first type of source may be configured to emit seismic energy according to a code that allows electronic equipment to distinguish between signals emitted by different sources, and a second type of source may emit seismic energy without applying a code.

The acquisition geometry of one or more streamer arrays 320 may be based on the desired offset of one or more sources or types of sources. For example, in some survey types, two separate vessels may each tow a separate streamer array as well as a higher frequency source with a small offset to its respective streamer array, and a third separate vessel may tow a lower frequency source at a higher offset to both streamer arrays. Geophysical survey design may involve iteration, with initial desired offsets and frequency bands informing an initial acquisition geometry, which then informs a more precise model of source offsets and operating frequencies, etc.

Figure 3B:
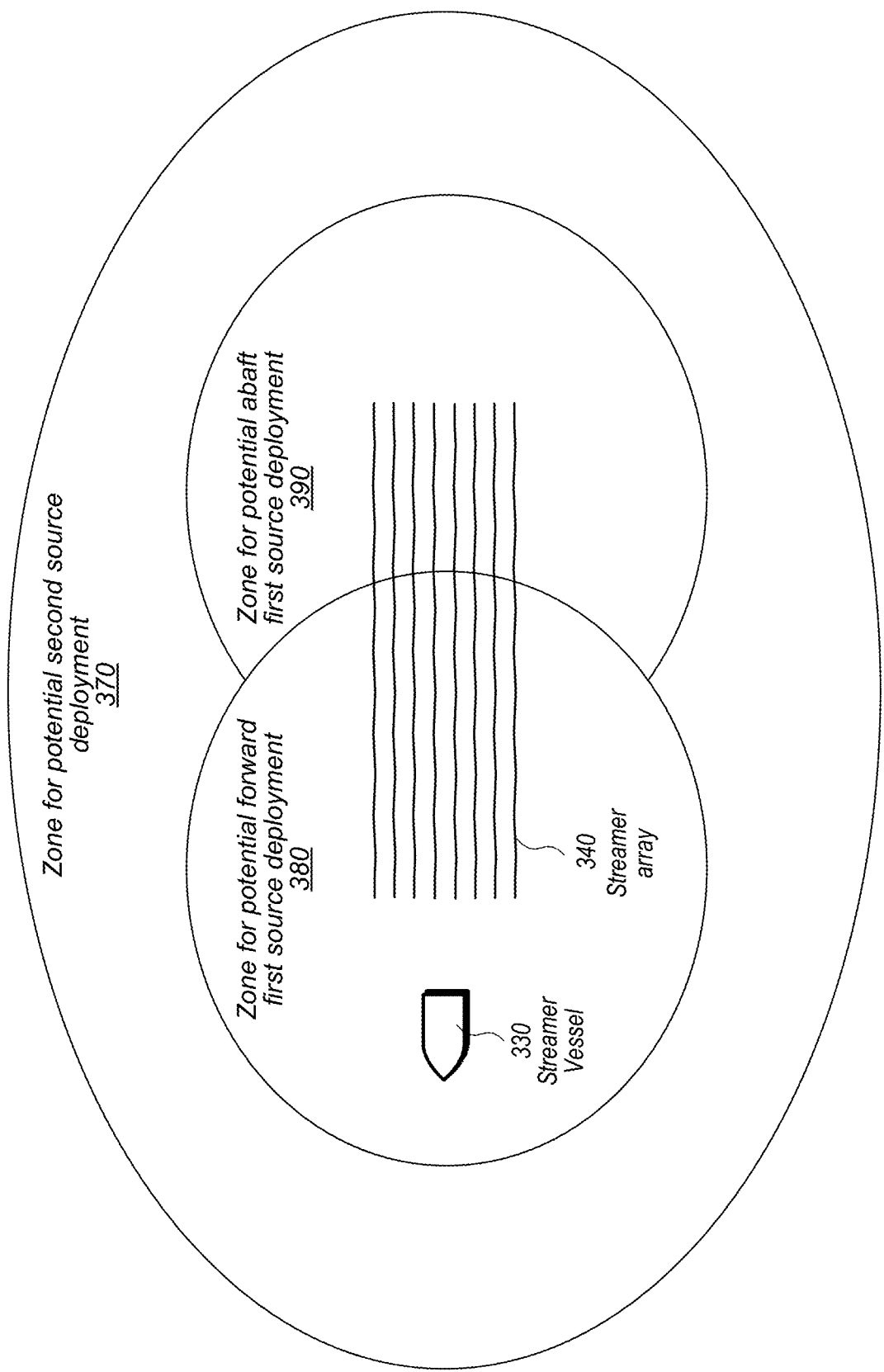
FIG. 3B is another diagram illustrating exemplary zones for deployment of first and second sets of vibratory sources, including multiple zones for sources in the first set, according to some embodiments.

FIG. 3B is another diagram illustrating exemplary zones for deployment of different source types, including multiple zones for a particular source type. In some embodiments, a particular set of one or more types of source may be placed in more than one zone. For example, low frequency sources and high frequency sources may be placed in zone 380, forward of streamer array 340, and low frequency sources and other high frequency sources may be placed in zone 390, abaft of streamer array 340. In the illustrated embodiment, zone 370 may be for deployment of a second type of source (e.g., high-frequency sources and not low-frequency sources). In some embodiments, only one source of a particular type may be placed in a zone. For example, zone 380 may contain only one high frequency source. In other embodiments, more than one source of a particular type may be placed in a zone. For example, zone 390 may contain two higher frequency sources, one on each side of streamer array 340.

Determination of a threshold offset distance, and determination of offsets for each source within the zone created by that threshold offset distance, may be based on one or more geophysical models. Different geophysical models may be applied to determine deployment of different sources or types of sources.

In some embodiments, the geophysical model that informs deployment of sources may be based on parameters that include one or more of, without limitation: frequency bands in which sources are configured (or are configured to be controlled) to emit, expected depth of subsea formations, filter properties of subsea formations, seismic propagation velocity, types of data processing to be performed on recorded survey data (e.g. image processing techniques), desired acquisition geometry, desired azimuths, desired offsets, desired amplitudes, known obstructions, operational limitations, sea currents, vessel towing capabilities, number of sources vessels available, etc. For example, the expected depth of subsea formations may inform the expected amount of high frequency reflections received by streamer array 340, and thus the threshold offset distance beyond which higher frequency sources will not be deployed. As another example, a geophysical model may predict the strength of reflected signals off a subsea formation based on filter properties of the subsea formation such as the material properties of the subsea formation and the azimuth angle at which the signal reflects from the formation.

Exemplary Frequency Content in Signals Emitted by Different Source Types

Figure 4A:
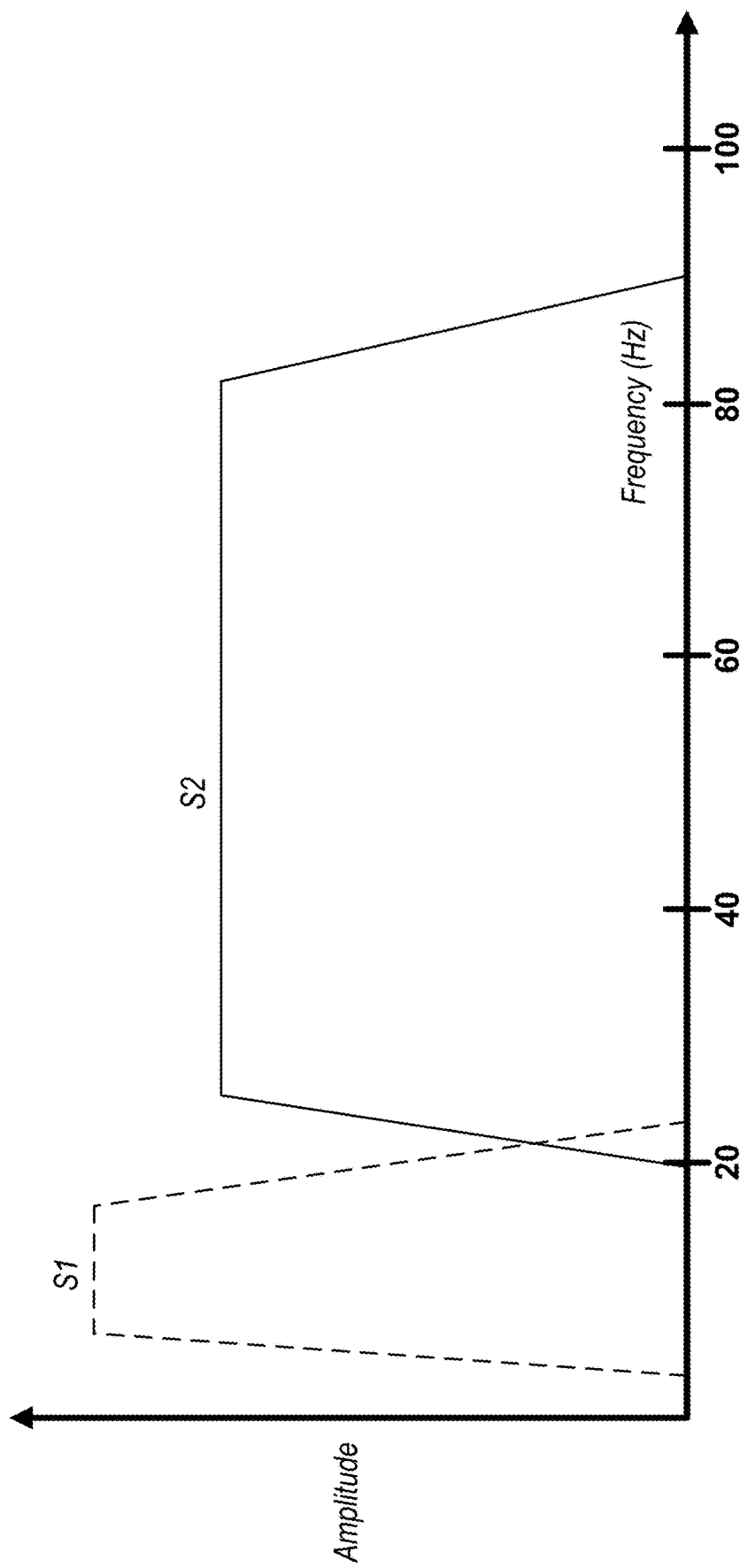
FIG. 4A is a diagram illustrating exemplary frequency content of signals emitted by sources in a first set and by sources in a second set, according to some embodiments.
Figure 4B:
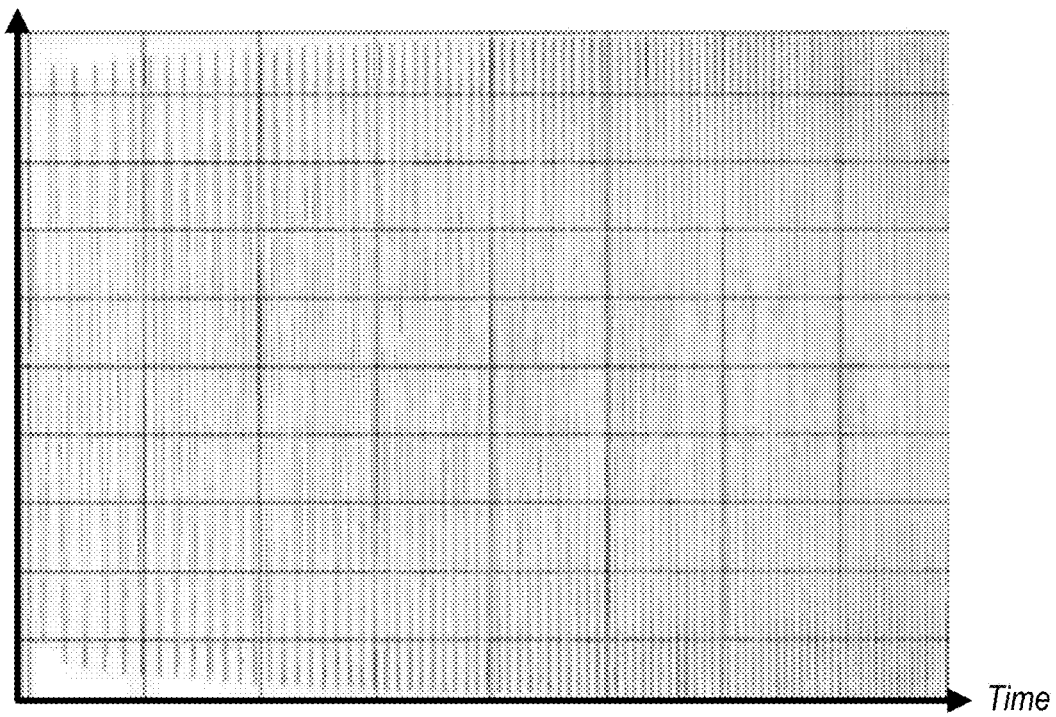
FIGS. 4B and 4C are diagrams illustrating exemplary sweeps for signals emitted by sources in a first set (FIG. 4C) and by sources in a second set (FIG. 4B), according to some embodiments.
Figure 4C:
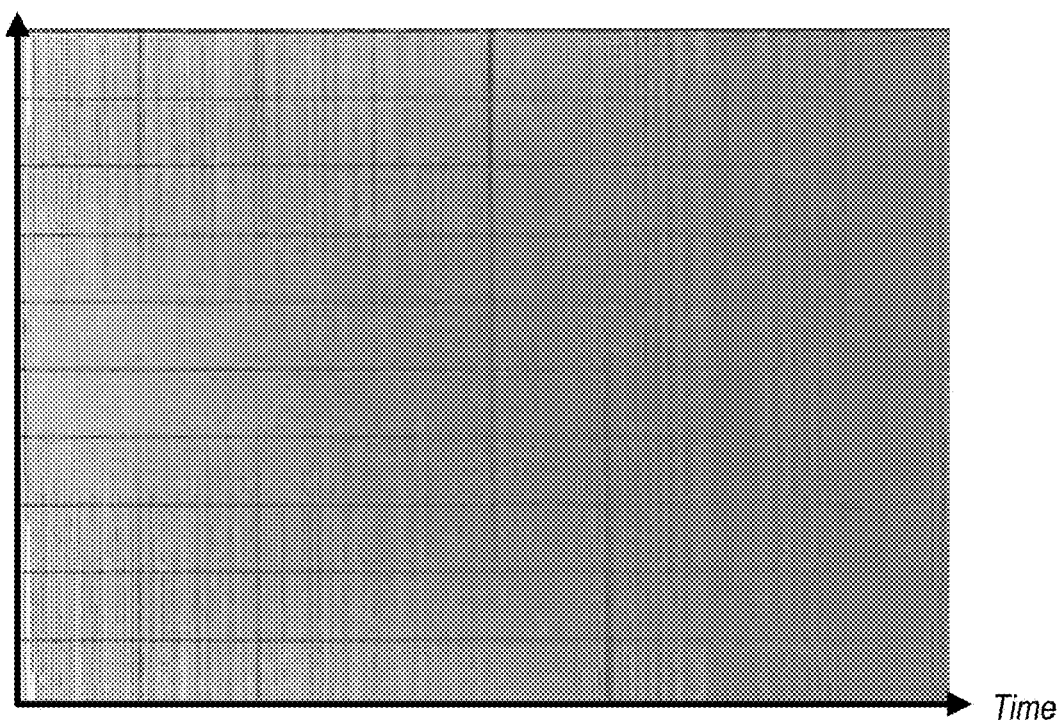

FIGS. 4A-C illustrate signal content of different exemplary source types. FIG. 4A illustrates exemplary frequency bands for emissions by different types of sources. The geophysical survey system may include a variety of seismic sources, such as marine vibrators, air guns, etc. Although techniques discussed herein use multiple types of sources to generate a range of frequency content, other embodiments achieve the same techniques with a single source type using all or only a portion of the frequency band that it is configured to emit.

In some embodiments, a lower frequency source emits signal S1 and a higher frequency source emits signal S2. The amplitude of signal S1 may be higher than signal S2 to reach deeper objectives. In some embodiments, the frequency band of signal S2 is wider than the frequency band of signal S1 to improve resolution of shallow objectives. In some embodiments, a source configured to emit only lower frequency or higher frequency signals emits the full frequency band it is configured to emit. In other embodiments, a source emits only a sub-band of frequencies the source is configured to emit. In some embodiments, a source emits only a sub-band of the frequencies it is configured to emit based on its offset from the streamer array of sensors. For example, a higher frequency source may emit a sub-band whose bandwidth decreases linearly as the source's offset from the streamer array increases (i.e. offset increases by a factor of 2, sub-band bandwidth decreases by a factor of 2).

In some embodiments, the geophysical survey system employs lower and higher frequency sources whose emitted signals, S1 and S2 respectively, overlap in frequency content. In other embodiments, the frequency content of signals S1 and S2 emitted by lower and higher frequency sources employed in the survey system is mutually exclusive. As used herein, the term "different" in the context of frequency bands includes both partially-overlapping and non-overlapping bands.

FIGS. 4B and 4C illustrate exemplary sweeps for lower and higher frequency sources, respectively. The term "sweep" is used in this application according to its accepted ordinary meaning in the art, which includes a time interval in which a vibratory source is activated to emit seismic energy. Typically, a sweep interval is followed by a listening interval during which reflections caused by the vibrations are recorded using seismic sensors. A given sweep being performed within a particular frequency band means that the source does not emit energy outside the frequency band during the sweep. During a given sweep, a source may emit energy at different frequencies at different times, within the overall particular frequency band of the sweep. FIG. 4B illustrates an exemplary acoustic signal emitted by a lower frequency source, represented in the time domain. FIG. 4C illustrates an exemplary acoustic signal emitted by a higher frequency source, represented in the time domain. In the illustrated embodiments, the sweeps begin at a lower frequency and sweep toward an upper frequency of the sweep. In other embodiments, any of various types of sweeps may be implemented.

A sweep function for a source may be based on that source's offset. In some embodiments, a sweep function for a type of source may be based on the threshold offset distance associated with the zone containing that type of source. For example, lower frequency sources placed beyond a high threshold offset distance may emit sweeps with a high amplitude and long duration to reach deeper objectives.

In some embodiments, the system is configured to increase sweep length for sources based on their respective offsets. For example, a lower frequency source deployed at a high offset may be driven to emit lower frequencies for a longer duration than an equivalent source with a smaller offset. In some embodiments, the energy emitted by a source is a function of the sweep length. For example, the energy emitted by a source may be directly proportional to the sweep length used by that source. Increasing sweep length over a smaller low frequency band may have the advantage of increasing energy content in lower frequencies that reach deeper objectives.

Different source types may employ different sweep functions. For example, a single lower frequency source may emit a simple linear sweep across its frequency band, whereas multiple higher frequency sources in the same survey may emit energy according to different codes that facilitate separation of signals from different higher frequency sources. Similarly, different sources within the same type of source may employ different sweep functions.

Sources may be driven simultaneously using different codes that are uncorrelated to at least a threshold degree. For example, U.S. Pat. No. 8,094,514 titled "Seismic Vibrator Array and Method for Using" discusses exemplary designs of vibratory sources and techniques for distinguishing between signals from different vibratory sources when operating simultaneously. Gold sequences and m-sequences are examples of codes that may be used to drive vibratory sources and may have little or no cross-correlation between different codes. Cross-correlation of received signals with known codes used to drive the sources may allow separation of signals from different sources during signal processing. Subsequent to the simultaneous sweeps, the vibratory sources may cease operation to allow a listening period in which sensors record reflected energy from the sweeps. In some embodiments, two or more the sources of the same type are driven using the same code. This may increase the amplitude of energy emitted using that code, for example. In other embodiments, two different sources in the same string of sources may be driven using different codes.

In some embodiments, sources of the same type may employ different sweep functions based on the zone in which a particular source is deployed. For example, a lower frequency source deployed at a larger offset may emit a longer sweep to reach deeper objectives. As another example, a number of higher frequency sources deployed densely at small offsets may employ different codes uncorrelated to at least a threshold degree to facilitate distinguishing between higher frequency signals.

Exemplary Frequency Content in Signals Emitted by Sources at Various Offsets

FIG. 5 illustrates exemplary frequency content emitted by sources placed at various different offsets. In FIG. 5, sources S1, S2, and S3 are deployed at progressively larger offsets from sensor RX. In the illustrated embodiment, each source emits energy in a different frequency band appropriate for its particular offset. As shown, source S3 emits lower frequency signals at a larger amplitude and longer duration to reach deeper objectives. Source S2 in the illustrated embodiment emits higher frequency signals with less amplitude due to its smaller offset, and source S3 in the illustrated embodiment emits the highest frequency signals across the widest bandwidth to improve resolution of shallow objectives at smaller offsets. In the illustrated example, sources operating in three different frequency bands are shown, but sources may be configured to emit (or controlled to emit) in any number of different frequency bands in various embodiments.

As illustrated in FIG. 5, a source may be driven based on its offset or deployed in a particular zone based on the frequencies it is configured to emit. The offset for a source may affect the source's sweep function (e.g., the sweep amplitude, duration, or code). The zone in which a source is deployed may affect frequency content and/or the sweep function emitted by a source. For example, all sources deployed in a zone with a small threshold offset distance may emit higher frequency signals at a lower amplitude, relative to sources deployed in another zone at larger offsets.

Sources may be controlled to emit energy in overlapping or non-overlapping frequency bands. For example, in the illustrated embodiment, sources S1 and S3 emit signals with no overlapping frequency content. In the illustrated embodiment, the upper band of S3's emitted frequency content overlaps with the lower band of S2's emitted frequency content. Similarly, the upper band of S2's emitted frequency content overlaps with the lower band of S1's emitted frequency content. As discussed above, sources S1, S2, and S3 may emit only a sub-band of those frequencies each source is configured to emit. For example, source S2 may be configured to emit frequencies from 5 Hz to 100 Hz, but only emit frequencies ranging from 20 Hz to 50 Hz when deployed at a particular offset. The frequency bands illustrated in FIG. 5 are included for purposes of illustration but are not intended to limit the scope of the present disclosure.

Exemplary Vessel Layout and Firing Pattern

Figure 6:
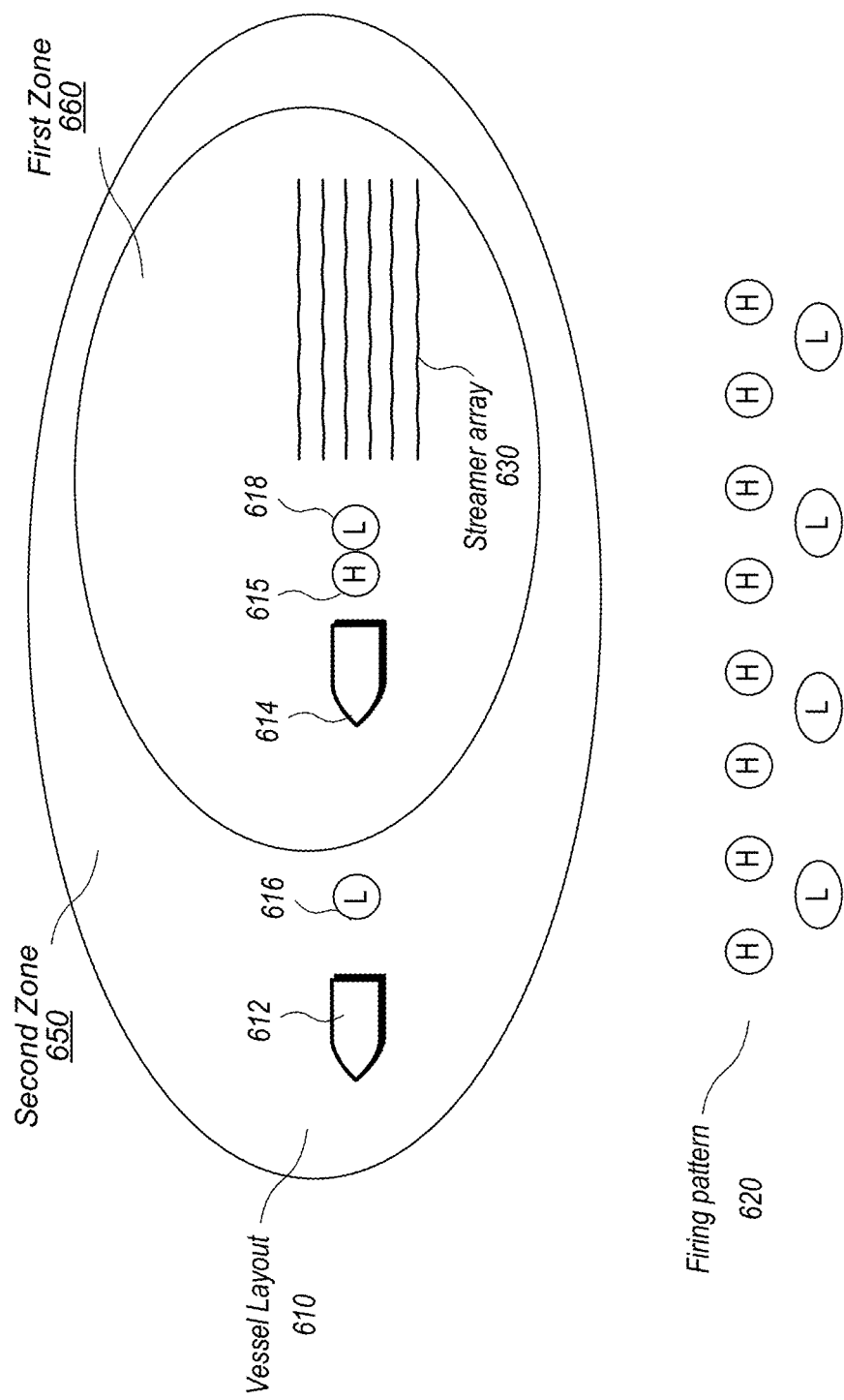
FIG. 6 is a diagram illustrating one embodiment of a vessel layout and activation pattern using sources from a first set and sources from a second set.

Survey results may be affected not only by signal content in sweeps, but also by the layout and activation pattern of various sources. FIG. 6 illustrates an exemplary vessel layout 610 and activation pattern 620 employing different types of sources deployed in different zones. In the illustrated embodiment, two vessels 612 and 614 respectively tow sources and sensors. Vessel 612 tows a single source 616, and vessel 614 tows sources 615 and 618 as well as streamer array 630. Source 616 of a second type is deployed in second zone 650. Both source 615 of a first type and source 618 of a second type are deployed in first zone 660, which has a smaller threshold offset distance. In the illustrated embodiment, an "L" refers to a relatively lower-frequency type of source and an "H" refers to a relatively higher-frequency type of source, although various types of sources may be used in different zones in other embodiments.

As illustrated in FIG. 6, first zone 660 and second zone 650 contain boundaries, relative to the positions of the respective survey vessels, outside of which first source 615 and second source 618 cannot be deployed, respectively. In some embodiments, however, zones may establish criteria for the geophysical data product that inform, but do not prohibit, source deployment. For example, first zone 660 may define the area in which first source 615 must be deployed to achieve a desired signal strength received by seismic sensors. Although the embodiment in FIG. 6 illustrates zones 650 and 660 limiting source deployment, source deployment may not be limited to a particular zone. First source 615 and second sources 616 and 618 may be differentiated based on other features, such as activation pattern, frequency of operation, or sweep length, among others.

Different sets of one or more sources may be driven according to different activation patterns. In the illustrated embodiment, second sources 616 and 618 activate at a slower rate than first source 615. Second sources 616 and 618 activate at a slower rate by activating less frequently in terms of time and/or distance. Second sources 616 and 618 may emit lower frequencies than first source 615. This may potentially improve energy content recovered from deep reflections while improving resolution for objectives targeted by a higher activation rate. Although described as different types of sources above, differentiation of first source 615 from second sources 616 and 618 may be based on other features, such as their mode of operation. For example, first source 615 and second sources 616 and 618 may all be wideband sources configured to emit seismic energy over both lower and higher frequencies, but first source 615 may be controlled to emit only higher frequency signals and second sources 616 and 618 controlled to emit only lower frequency signals. As another example, first source 615 may activate according to a first activation pattern, and second sources 616 and 618, although of the same type of source as first source 615 (e.g. wideband), may activate according to a different activation pattern.

One or more sources may activate with a longer sweep length as the one or more sources activate less frequently. Similarly, one or more sources of a type may activate with a longer sweep length than one or more sources of a different type. In the illustrated embodiment, sources 616 and 618 activate at a longer sweep length than source 615. Sources 616 and 618 may emit lower frequencies at a longer sweep length, with the sweep length increasing as sources 616 and 618 activate less frequently.

Survey Method Based on Frequency Emissions of the Sources

Figure 7:
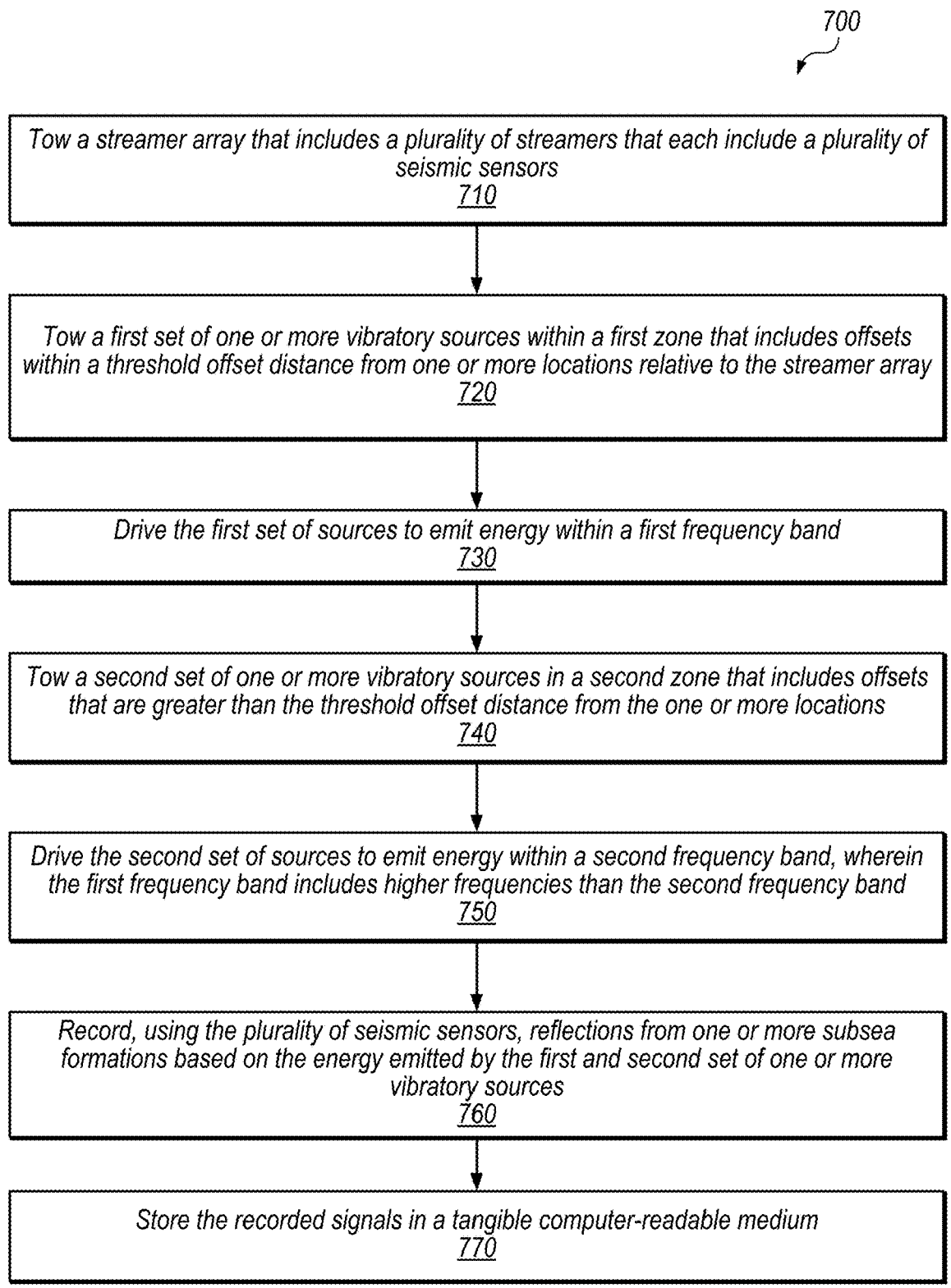
FIG. 7 is a flow diagram illustrating a method for manufacturing a geophysical data product using a frequency-dependent spatial distribution of vibratory sources, according to some embodiments.

Referring now to FIG. 7, an exemplary method 700 for manufacturing a geophysical data product is shown, according to some embodiments. The method shown in FIG. 7 may be used in conjunction with any of the computing systems, devices, elements, or components disclosed herein, among other devices. In various embodiments, some of the method elements shown may be performed concurrently, in a different order than shown, or may be omitted. Additional method elements may also be performed as desired. Flow begins at block 710.

At 710, in the illustrated embodiment, one or more vessels tow a plurality of streamers that each include a plurality of seismic sensors. The seismic sensors may be physically incorporated into the streamers or may be attached to the streamers (e.g., such that they can be detached when not in use).

At 720, in the illustrated embodiment, one or more vessels tow a first set of one or more vibratory sources within a first zone that includes offsets within a threshold offset distance from one or more locations relative to the streamer array. As discussed above with reference to FIG. 3A, the first zone limiting deployment of different types of sources may be determined based on a threshold offset distance, and the choice of reference locations relative to the streamer array for the threshold offset distance may define certain characteristics of the first zone.

At 730, in the illustrated embodiment, electronic equipment drives the first set of sources to emit energy within a first frequency band. This may involve actually transmitting different sweep functions and/or codes to the sources or sending control information that specifies different pre-programmed sweep functions and/or codes for the sources to use, for example. One or more of the first set of sources may be configured to emit energy across the entirety of the first frequency band, but may only emit energy within a sub-band of the first frequency band.

At 740, in the illustrated embodiment, one or more vessels tow a second set of one or more vibratory sources in a second zone that includes offsets that are greater than the threshold offset distance from the one or more locations. One or more of the second set of sources may also be deployed in the first zone.

At 750, in the illustrated embodiment, electronic equipment drives the second set of sources to emit energy within a second frequency band, wherein the first frequency band includes higher frequencies than the second frequency band. The first frequency band may also include frequencies within the second frequency band. Emission of different frequency content in different zones may be limited not only by the type of source deployed within a particular zone, but also by the mode of operation of a particular source (e.g. a high frequency source emitting only a sub-band of the bandwidth it is configured to emit).

At 760, in the illustrated embodiment, the survey system uses the plurality of seismic sensors to record reflections from one or more subsea formations based on the energy emitted by at least the first and second sets of one or more vibratory sources. Driving one or more sources with different codes may allow separation of recorded signals from different sources during signal processing.

At 770, in the illustrated embodiment, the recorded signals are stored in a tangible, non-transitory computer-readable medium 1045. The tangible, non-transitory computer-readable medium containing the recorded signals (and/or results of processing the recorded signals) may be referred to as a geophysical data product.

In various embodiments, the disclosed techniques may advantageously simplify equipment used for towing sources (e.g., relative to surveys deploying different sources), reduce survey complexity without reducing resolution, increase resolution without increasing survey complexity, and/or reduce the environmental impact of emitting seismic energy, for example.

Figure 8:
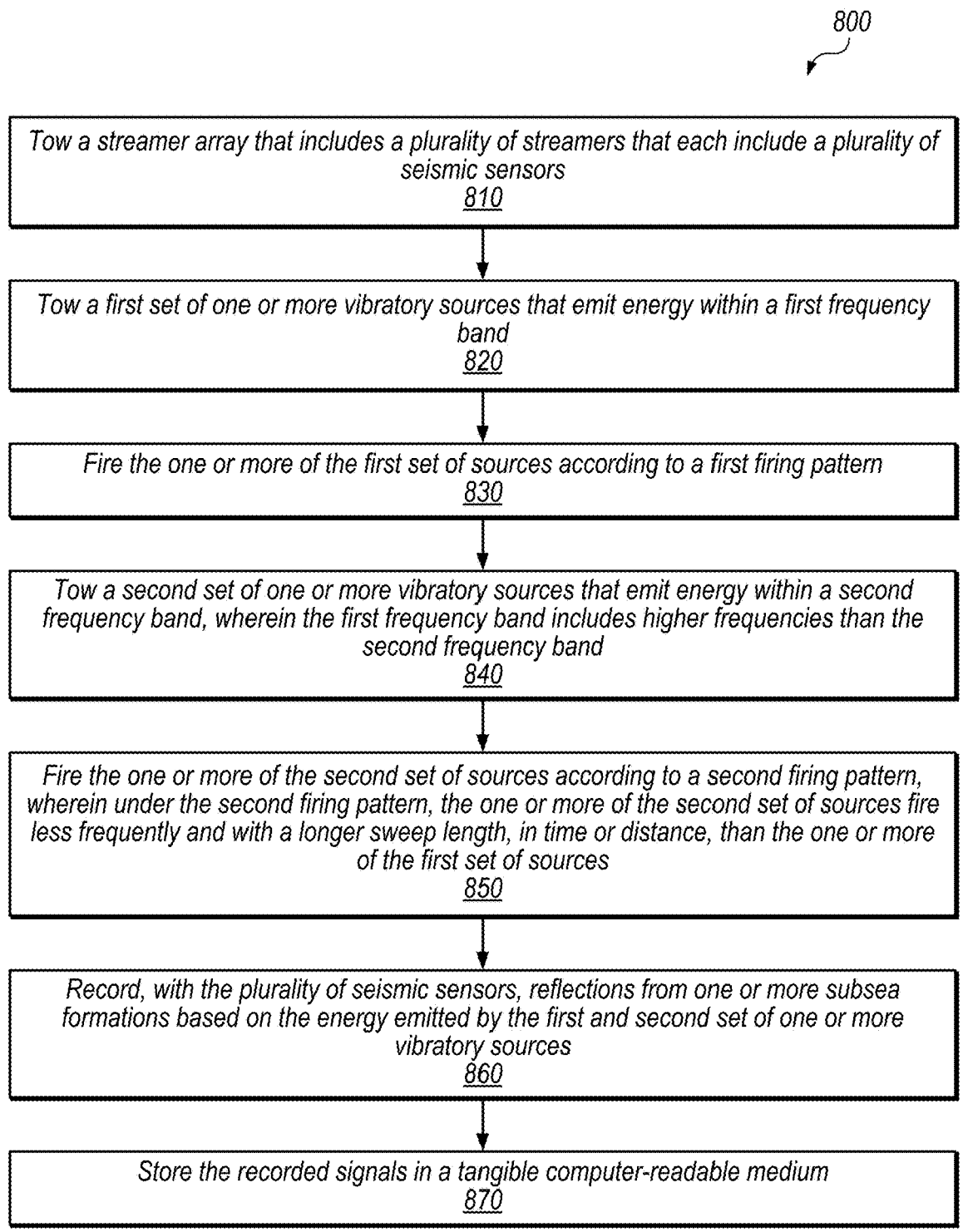
FIG. 8 is a flow diagram illustrating a method for manufacturing a geophysical data product using different activation patterns for sources at different offsets, according to some embodiments.

Survey Method Based on Different Firing Patterns for Sources at Different Offsets Referring now to FIG. 8, an exemplary method 800 for manufacturing a geophysical data product using different source activation patterns for sources at different offsets is shown, according to some embodiments. The method shown in FIG. 8 may be used in conjunction with any of the computing systems, devices, elements, or components disclosed herein, among other devices. In various embodiments, some of the method elements shown may be performed concurrently, in a different order than shown, or may be omitted. Additional method elements may also be performed as desired. Flow begins at block 810.

At 810, in the illustrated embodiment, one or more vessels tow a plurality of streamers that each include a plurality of seismic sensors. The seismic sensors may be physically incorporated into the streamers or may be attached to the streamers (e.g., such that they can be detached when not in use).

At 820, in the illustrated embodiment, one or more vessels tow a first set of one or more vibratory sources that emit energy within a first frequency band. One or more of the first set of sources may be configured to emit energy across the entirety of the first frequency band, but may only emit energy within a sub-band of the first frequency band.

At 830, in the illustrated embodiment, electronic equipment activates the one or more of the first set of sources according to a first source activation pattern. The source activation pattern may be described in various manners, for example, in terms of shot point interval or shooting pattern. Firing may involve actually transmitting different sweep functions and/or codes to the sources or sending control information that specifies different pre-programmed sweep functions and/or codes for the sources to use, for example.

At 840, in the illustrated embodiment, one or more vessels tow a second set of one or more vibratory sources that emit energy within a second frequency band, wherein the first frequency band includes higher frequencies than the second frequency band. The first frequency band may also include frequencies within the second frequency band. Emission of different frequency content by different sources may be limited not only by the type of source deployed, but also by the mode of operation of a particular source (e.g. a high frequency source emitting only a sub-band of the bandwidth it is configured to emit).

At 850, in the illustrated embodiment, electronic equipment activates the one or more of the second set of sources according to a second activation pattern, wherein under the second source activation pattern, the one or more of the second set of sources activate less frequently and with a longer sweep length, in time and/or distance, than the one or more of the first set of sources. Sources may emit lower frequencies at a longer sweep length, with the sweep length increasing as sources activate less frequently. This may potentially improve energy content recovered from deep reflections while improving resolution for objectives targeted by a higher activation rate.

At 860, in the illustrated embodiment, electronic equipment records, with the plurality of seismic sensors, reflections from one or more subsea formations based on the energy emitted by the first and second set of one or more vibratory sources. Driving one or more sources with different codes may allow separation of recorded signals from different sources during signal processing.

At 870, in the illustrated embodiment, the recorded signals are stored in a tangible, non-transitory computer-readable medium 1045. The tangible, non-transitory computer-readable medium containing the recorded signals (and/or results of processing the recorded signals) may be referred to as a geophysical data product.

In various embodiments, potential advantages of the disclosed techniques include reduced survey complexity without reduced resolution, increased resolution without increased survey complexity, improved energy content recovered from deep reflections, and/or reduced environmental impact from emitting seismic energy, for example.

Survey Method Based on a Geophysical Model

Figure 9A:
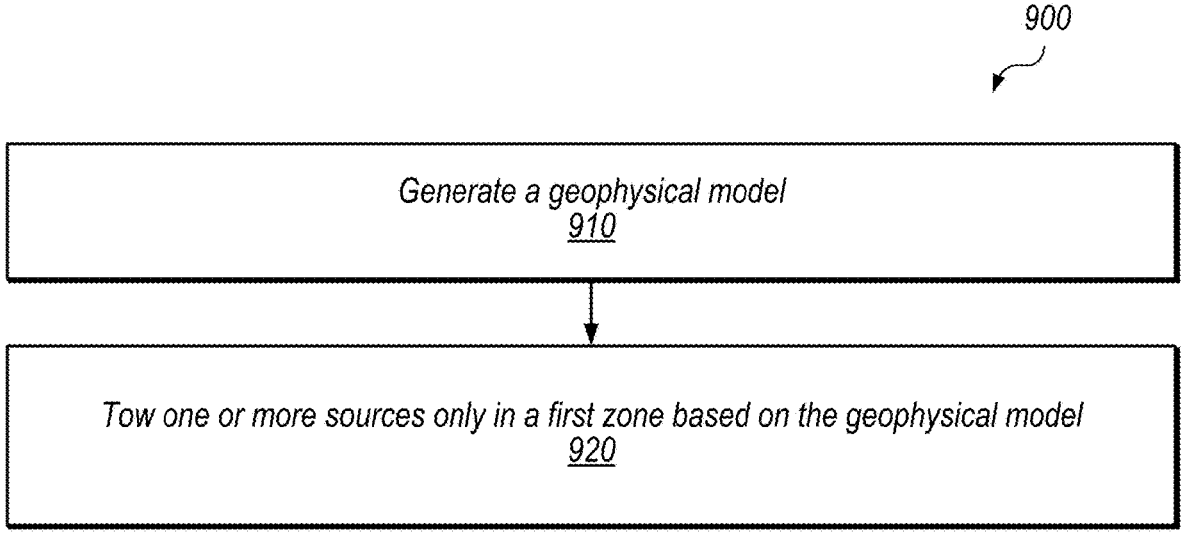
FIGS. 9A-9B are flow diagrams illustrating methods for configuring a survey using a geophysical model, according to some embodiments.

Referring now to FIG. 9A, an exemplary method 900 for configuring a survey using a geophysical model is shown, according to some embodiments. The method shown in FIG. 9A may be used in conjunction with any of the computing systems, devices, elements, or components disclosed herein, among other devices. In various embodiments, some of the method elements shown may be performed concurrently, in a different order than shown, or may be omitted. Additional method elements may also be performed as desired. Flow begins at block 910.

At 910, in the illustrated embodiment, one or more computing devices generate a geophysical model. As discussed above, the geophysical model may be based on parameters that include one or more of, without limitation: frequency bands in which sources are configured to emit, expected depth of subsea formations, filter properties of subsea formations, filter properties of a sea medium, seismic propagation velocity, types of data processing to be performed on recorded survey data, and desired acquisition geometry. The geophysical model may use data from prior geophysical surveys to determine one or more of the above parameters. The geophysical model may include processed geophysical data and may be stored on a non-transitory, tangible computer-readable medium. The geophysical model may be generated offshore (i.e. by equipment on a survey vessel) or onshore (i.e. at a facility on land).

The geophysical model may predict various characteristics of a geophysical formation which may be useful for location and/or extraction of mineral deposits. The geophysical model may be used to predict characteristics of a geophysical data product to be recorded in a survey that corresponds to the model. For example, the geophysical model may compare one or more frequency bands of emitted energy to the expected depth of subsea formations to predict the reflected energy received by seismic sensors in the one or more frequency bands. In another example, the geophysical model may apply various image processing techniques to geophysical data (e.g. signals expected to be received at seismic sensors based on the expected depth of subsea formations and filter properties of a sea medium in prior geophysical surveys) in order to predict resolution of an image.

At 920, in the illustrated embodiment, one or more vessels tow one or more sources only in a first zone based on the geophysical model. For example, a vessel may tow higher frequency sources only in a first zone containing relatively smaller offsets from a streamer array of seismic sensors based on a geophysical model indicating that higher frequency emissions beyond the offset distances contained within the first zone are unlikely to contribute to survey results after reflection off the targeted subsea formations. In other embodiments, by way of further example, a vessel may tow wideband sources only in a first zone based on a geophysical model indicating that both low and high frequency emissions are needed to effectively image subsea formations targeted by sources in the first zone.

Figure 9B:
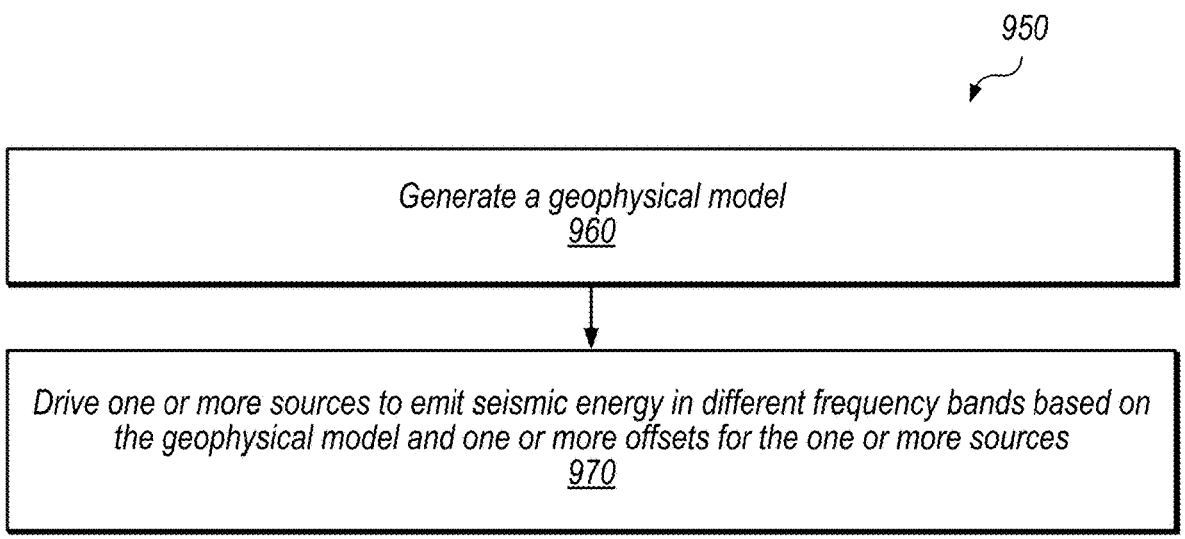

In FIG. 9B, another exemplary method 950 for configuring a survey using a geophysical model is shown. The method shown in FIG. 9B may be used in conjunction with any of the computing systems, devices, elements, or components disclosed herein, among other devices. In various embodiments, some of the method elements shown may be performed concurrently, in a different order than shown, or may be omitted. Additional method elements may also be performed as desired. Flow begins at block 960.

At 960, in the illustrated embodiment, one or more computing devices (e.g. the exemplary embodiment discussed below with reference to FIG. 10) generate a geophysical model. As discussed above with reference to FIG. 9A, the geophysical model may be based on one or more of a number of different types of parameters. The geophysical model may include data from prior geophysical surveys to determine one or more of the above parameters. The geophysical model may include processed geophysical data and may be stored on a non-transitory, tangible computer-readable medium. The geophysical model may be generated offshore (i.e. by equipment on a survey vessel) or onshore (i.e. at a facility on land).

At 970, in the illustrated embodiment, electronic equipment drives one or more sources to emit seismic energy in different frequency bands based on the geophysical model and one or more offsets for the one or more sources. For example, a vessel may tow one or more wideband sources at large offset distances, and electronic equipment may drive the wideband sources to emit energy only at lower frequencies based on a geophysical model indicating that higher frequency emissions at or beyond the employed offset distances are unlikely to be received by seismic sensors after reflection off the subsea formations targeted by the wideband sources. Electronic equipment may drive one or more sources to emit seismic energy in a frequency band based on driving another set of one or more sources to emit seismic energy in a different frequency band. For example, electronic equipment driving both a lower frequency source and a higher frequency source towed at approximately the same offset location may limit emissions from the lower frequency source to low frequencies because it drives the higher frequency source to emit energy at higher frequencies.

Exemplary Computing Device

Figure 10:
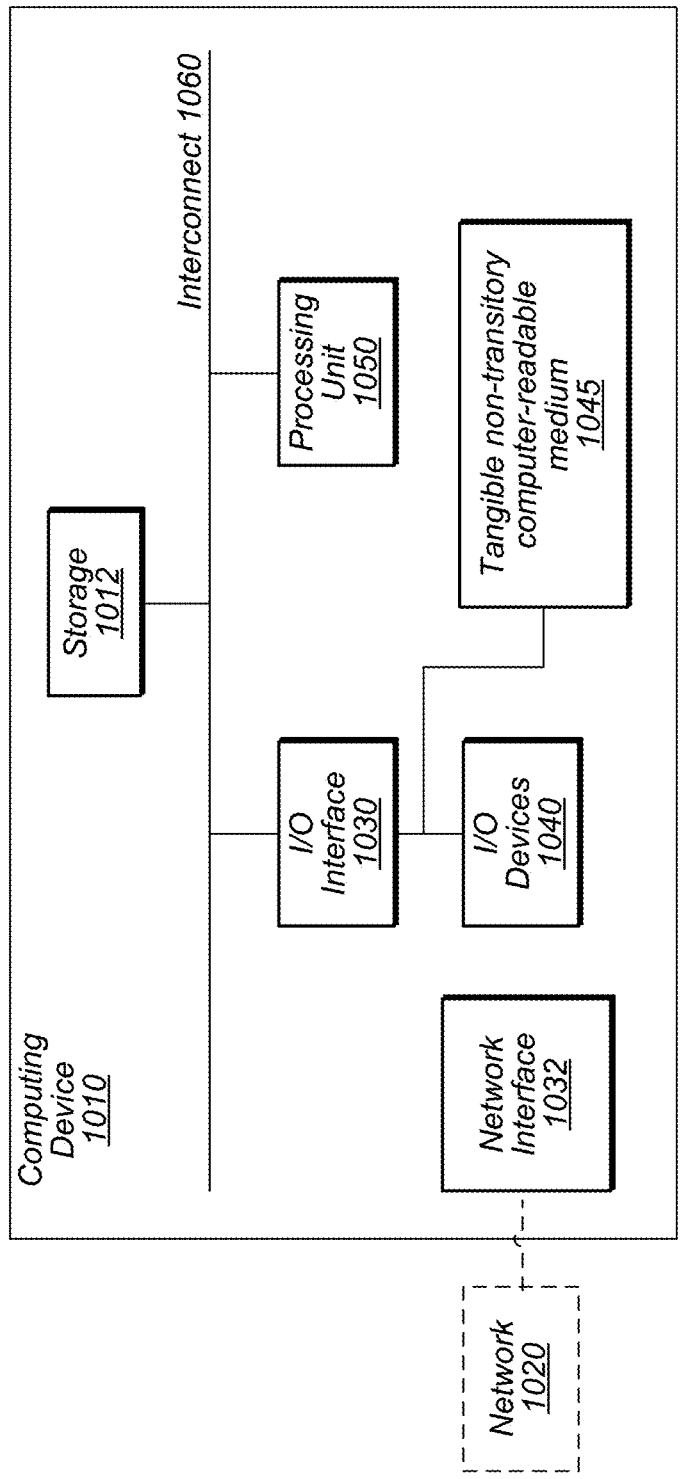
FIG. 10 is a block diagram illustrating one embodiment of a computing system.

Turning now to FIG. 10, a block diagram of one embodiment of computing device (which may also be referred to as a computing system) 1010 is depicted. Computing device 1010 may be used to implement various portions of this disclosure. Computing device 1010 may be any suitable type of device, including, but not limited to, a personal computer system, desktop computer, laptop or notebook computer, mainframe computer system, web server, workstation, or network computer. As shown, computing device 1010 includes processing unit 1050, storage 1012, input/output (I/O) interface 1030 coupled via an interconnect 1060 (e.g., a system bus). I/O interface 1030 may be coupled to one or more I/O devices 1040. Computing device 1010 further includes network interface 1032, which may be coupled to network 1020 for communications with, for example, other computing devices.

In various embodiments, processing unit 1050 includes one or more processors. In some embodiments, processing unit 1050 includes one or more coprocessor units. Multiple instances of processing unit 1050 may be coupled to interconnect 1060. Processing unit 1050 (or each processor within 1050) may contain a cache or other form of on-board memory. In some embodiments, processing unit 1050 may be implemented as a general-purpose processing unit, and in other embodiments it may be implemented as a special purpose processing unit (e.g., an ASIC). In general, computing system 1010 is not limited to any particular type of processing unit or processor subsystem.

As used herein, the terms "processing unit" or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions from any suitable form of non-transitory computer-readable media to perform specified operations.

Storage subsystem 1012 is usable by processing unit 1050 (e.g., to store instructions executable by and data used by processing unit 1050). Storage subsystem 1020 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 1012 may consist solely of volatile memory in one embodiment. Storage subsystem 1012 may store program instructions executable by computing device 1010 using processing unit 1050, including program instructions executable to cause computing device 1010 to implement the various techniques disclosed herein.

I/O interface 1030 may represent one or more interfaces and may be any of various types of interfaces configured to couple to and communicate with other devices, according to various embodiments. In one embodiment, I/O interface 1030 is a bridge chip from a front-side to one or more back-side buses. I/O interface 1030 may be coupled to one or more I/O devices 1040 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. These articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

In some embodiments, a geophysical data product may be produced. In some embodiments, the geophysical data product may be a tangible, non-transitory computer-readable storage medium 1045 that stores recorded data, as shown in FIG. 10. This medium may or may not be included in device 1010 and may store processed and/or unprocessed geophysical data from device 1010.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method of manufacturing a geophysical data product, comprising:
   towing a streamer array that includes a plurality of streamers that each include a plurality of seismic sensors;
   towing a first set of one or more vibratory sources within a first zone that includes only offsets within a threshold offset distance, from one or more locations relative to the streamer array, wherein the threshold offset distance is defined in one or more directions parallel to the water surface;
   driving the first set of sources to emit energy within a first frequency band;
   towing a second set of one or more vibratory sources in a second zone that includes only offsets that are greater than the threshold offset distance, in one or more directions parallel to the water surface, from the one or more locations;
   driving the second set of sources to emit energy within a second frequency band, wherein the first frequency band includes higher frequencies than the second frequency band and wherein the driving the second set of sources uses longer activation durations than the driving the first set of sources;
   recording, using the plurality of seismic sensors, signals reflected from one or more subsea formations based on the energy emitted by the first and second set of one or more vibratory sources; and
   storing the recorded signals in a tangible computer-readable medium, thereby completing manufacture of the geophysical data product.

2. The method of claim 1, wherein the first and second frequency bands are mutually exclusive.

3. The method of claim 1, wherein one or more of the first set of sources emits energy only within a sub-band of the first frequency band.

4. The method of claim 1, further comprising:
   determining a sweep function for one or more of the first and second set of sources based on offsets for the one or more sources.

5. The method of claim 1, wherein the driving the first set of sources and second set of sources includes driving first and second sets of sources uses linear sweep functions.

6. The method of claim 1, further comprising:
   determining an acquisition geometry of the plurality of seismic sensors based on desired offsets of one or more of the first and second set of sources.

7. The method of claim 1, wherein the driving the first set of sources and second set of sources includes driving first and second sets of sources includes:
   simultaneously driving one or more of the first set of sources and one or more of the second set of sources using different codes that are uncorrelated to at least a threshold degree.

8. The method of claim 1, further comprising:
   determining the first and second zones based on a geophysical model.

9. The method of claim 8, wherein the geophysical model is based on parameters that include one or more of: expected depth of subsea formations, filter properties of subsea formations, or seismic propagation velocity.

10. The method of claim 1, further comprising:
    driving one or more of the first set of sources according to a first activation pattern; and
    driving one or more of the second set of sources according to a second activation pattern, wherein under the second activation pattern, the one or more of the second set of sources activate less frequently, in time or distance, than the one or more of the first set of sources.

11. The method of claim 10, wherein the second frequency band includes a smaller range of frequencies than the first frequency band.

12. The method of claim 1, further comprising:
    towing at least a portion of the first set of sources and at least a portion of the second set of sources using different vessels.

13. The method of claim 1, further comprising:
towing at least one source of the first and second set of sources using a different vessel than a vessel that performs towing of at least a portion of the streamer array.

14. The method of claim 1, wherein the first zone is one of: a circular region within a threshold radios from a point on the streamer array, an oblong region within a threshold distance from a centerline of the streamer array, or a region within a threshold distance of one or more points located outside of the streamer array.

15. The method of claim 1, wherein the driving the second set of sources includes driving the second set of sources to emit signals having a greater amplitude than an amplitude of the first set of sources.

16. A system, comprising:
a streamer array that includes a plurality of streamers that each include a plurality of seismic sensors;
tow equipment;
a first set of one or more vibratory sources configured to emit energy within a first frequency band, wherein the tow equipment is configured to tow the first set of sources within a first zone that includes only offsets within a threshold offset distance, from one or more locations relative to the streamer array, wherein the threshold offset distance is defined in one or more directions parallel to the water surface; and
a second set of one or more vibratory sources configured to emit energy within a second frequency band, wherein the first frequency band includes higher frequencies than the second frequency band, and wherein tow equipment is configured to tow ones of the second set of sources in a second zone that includes only offsets, in one or more directions parallel to the water surface, that are greater than the threshold offset distance from the one or more locations;
wherein the system is configured to drive the second set of sources using longer activation durations than the first set of sources.

17. The system of claim 16, further comprising:
one or more vessels including tow equipment configured to tow a portion of the sources and sensors.

18. The system of claim 16, further comprising:
control equipment configured to arrange the plurality of seismic sensors according to an acquisition geometry determined based on desired offsets of one or more of the first and second set of sources.

19. The system of claim 16, wherein the first and second frequency bands are mutually exclusive.

20. At least one non-transitory computer-readable medium having instructions stored thereon that are executable by one or more computing devices to perform operations comprising:
driving a first set of one or more vibratory sources to emit energy within a first frequency band, wherein the first set of sources is towed within a first zone that includes only offsets within a threshold offset distance, from one or more locations relative to a streamer array, wherein the threshold offset distance is defined in one or more directions parallel to the water surface;
driving a second set of one or more vibratory sources to emit energy within a second frequency band, wherein the second set of sources is towed in a second zone that includes only offsets that are greater than the threshold offset distance, in one or more directions parallel to the water surface, from the one or more locations, and wherein the first frequency band includes higher frequencies than the second frequency band and wherein the driving the second set of sources uses longer activation durations than the driving the first set of sources;
recording, with a plurality of seismic sensors, signals reflected from one or more subsea formations based on the energy emitted by the first and second set of one or more vibratory sources; and
storing the recorded signals in a tangible computer-readable medium.

* * * * *